United States Patent [19]

Mickelsson et al.

[11] 4,260,307

[45] Apr. 7, 1981

[54] WORK TABLE FOR MACHINE TOOLS

[76] Inventors: Sven-Mikael Mickelsson, Box 5770, 821 00 Bollnas; Sture R. Hall, Runemo 4231, 822 00 Alfta, both of Sweden

[21] Appl. No.: 43,356

[22] Filed: May 29, 1979

[30] Foreign Application Priority Data

Jun. 6, 1978 [SE] Sweden .......................................... 7806547
[51] Int. Cl.$^3$ .............................................. B23Q 3/06
[52] U.S. Cl. ......................................... 409/225; 269/34; 269/94; 269/218; 409/903
[58] Field of Search ............... 409/221, 219, 224, 225, 409/903; 269/34, 218, 93, 94

[56] References Cited

U.S. PATENT DOCUMENTS 2,364,239   12/1944   Parks ........................................ 269/34
3,830,485   8/1974    Mickelsson et al. ................. 409/225

FOREIGN PATENT DOCUMENTS 122124   12/1926   Switzerland ............................. 269/218

*Primary Examiner*—Z. R. Bilinsky
*Attorney, Agent, or Firm*—Eric Y. Munson

[57] ABSTRACT

A work table for machine tools such as pillar-type drills and the like comprising a substantially horizontal plate forming a work surface through which are cut a plurality of longitudinal or radially extending grooves. A flange depending from the peripheral edge of the horizontal plate is supported on a base plate and is provided with a plurality of vertical openings aligned with the grooves in the work surface. A clamping plate is mounted to move vertically beneath the work surface within a space defined by said flange and said base plate and is also provided with grooves arranged in alignment with the grooves in the work surface. The clamping plate is connected to power transmission means which allows the clamping plate to be moved into positions which are inclined relative to the work surface.

4 Claims, 3 Drawing Figures

WORK TABLE FOR MACHINE TOOLS

BACKGROUND OF THE INVENTION

Through the Swedish Pat. No. 350,919 (corresponding to U.S. Pat. No. 3,850,405) it is known to provide work tables for machine tools with T-grooved clamping bars which are vertically movable in grooves provided in the table, said clamping bars acting on one or two clamping bolts for clamping workpieces on the table. The clamping bars are operated by, for example, compressed-air cylinders. The clamping bars can assume inclined positions in their grooves in the table, i.e. be raised or lowered more at one end then at the other. In this way height differences between two clamping points along the bar are automatically compensated for, or differences in the effective length of the clamping bolts, which length is usually adjusted by means of nuts threaded onto the bolts and co-operating with clamping irons which clamp the workpiece. This gives a very quick and convenient clamping of workpieces For work tables of this kind it is usual to provide, in its top surface serving as the work surface, a plurality of fixed, conventional T-grooves and only one movable, T-grooved clamping bar. This is necessitated both with a view to the costs involved, and the space required for the clamping bar and the associated compressed-air cylinders and power transmitting devices. A resulting limitation is, therefore, that an automatic height compensation can only be obtained at two points which must be situated along the single movable clamping bar. Further, the height required for this type of work table is considerable, which renders it unsuitable for certain types of machine tool.

A solution to the problem of obtaining both a low building height, and height compensation when clamping is done at more than two points, is suggested in the Swedish Pat. No. 7604795-0. In this case, movable clamping bars are used which have been made flexible by being composed of a number of short sections connected to each other by means of an elastic material, each section being individually acted on by power transmitting devices. However, this, too, represents an expensive design which is suitable chiefly for exacting clamping conditions and expensive machine tools such as, for example, milling machines.

SUMMARY OF THE INVENTION

The object of the present invention is to provide a work table for machine tools which has a vertically movable clamping device which provides for automatic height compensation at up to three points which do not have to be situated along the same line; which has a low building height and which is inexpensive enough to be suitable for less expensive machine tools, for example pillar-type drills. Another object is to arrange this clamping device in such a way that it permits rotation of the table, for example for drilling a number of holes at a given dividing distance from each other, in which case the table can also be made with an indexing apparatus built into it. These objects have been attained by giving the work table the characteristics set forth in the following patent claims.

BRIEF DESCRIPTION OF THE DRAWINGS

The invention is described more in detail in the following, with reference to the accompanying drawings.

DETAILED DESCRIPTION OF PREFERRED EMBODIMENT OF THE INVENTION

Figure 1:
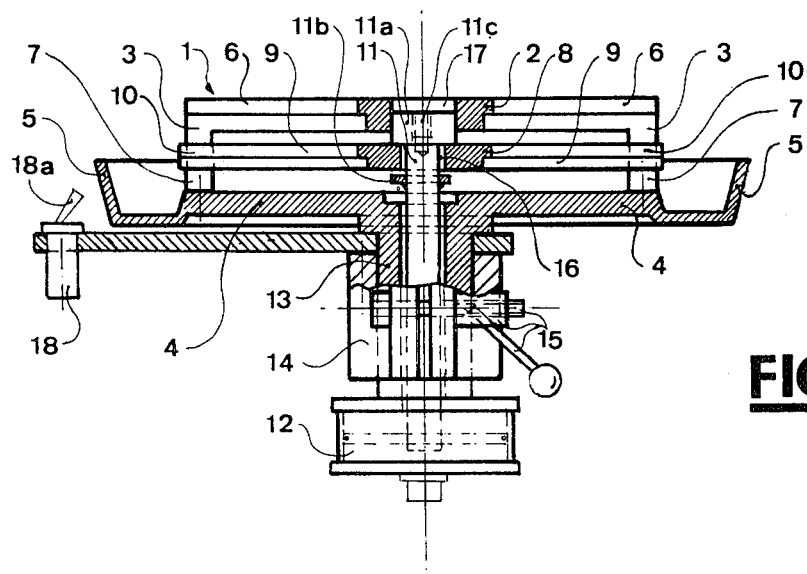
FIG. 1 is a side elevation partly in section of the work table.
Figure 2:
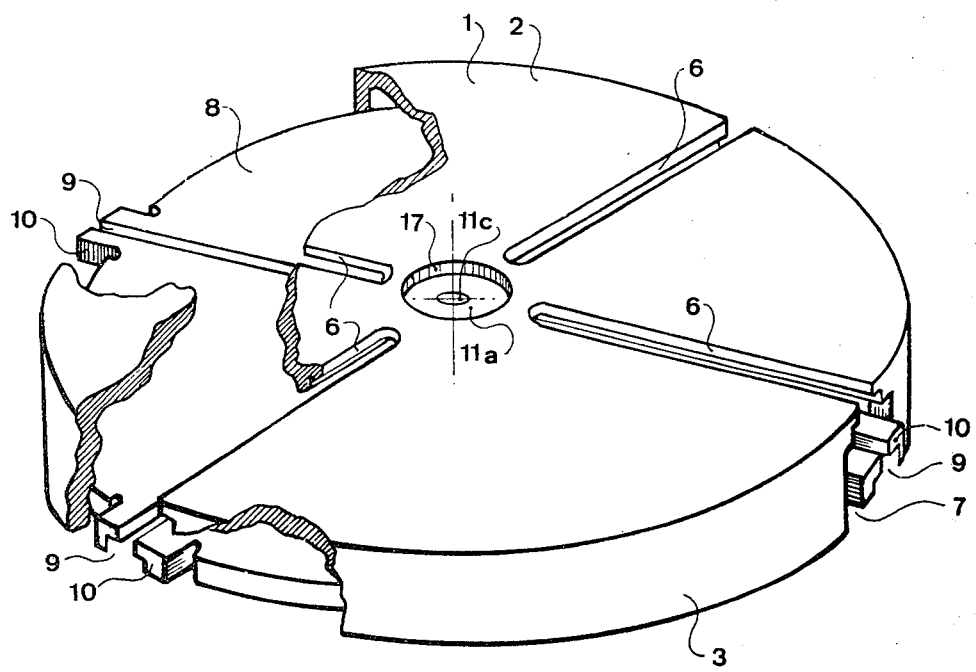
FIG. 2 a cut-away view with the lower portions of the table omitted.

In the drawings, the numeral 1 designates the entire work table. The table has an upper portion 2 serving as a work surface. This portion is provided with a downwardly pointing flange or wall 3, the lower end of which rests against a lower portion 4 of the table. This lower portion is suitably provided with a gutter 5 protruding outside the portion 2 for the collection of coolant. In the work surface 2 a number of grooves 6 are provided, suitably T-grooves, which extend through the entire thickness of the work surface from its outer edge and a distance across the table, preferably to the proximity of its centre. The number of grooves can vary —FIG. 2 shows an embodiment with four grooves and FIG. 3 an embodiment with three grooves. In the examples shown, the grooves are arranged like the spokes of a wheel, but it is also possible to have a number of parallel grooves extending towards each other from two opposite sides of the table. The grooves 6 pass through the flange 3 and connect downwards with an opening 7 in the flange.

Between the upper portion or work surface 2 and the lower portion 4, inside the flange 3, a clamping plate 8 is provided. This clamping plate is, in the same way as the work surface 2, provided with grooves 9, suitably T-grooves, which are directly below the grooves in the work surface. The clamping plate is provided with a number of protruding portions 10 through which the T-grooves 9 extend. These portions extend into and are guided laterally by the openings 7 of the flange 3. The clamping plate is vertically movable in the space between the upper portion or work surface 2 and the lower portion 4 by means of the rod 11, which is actuated by means of a pneumatic cylinder 12. The rod 11 passes through a hollow trunnion 13 rigidly connected to the bottom side of the table. The cylinder connects against one end of this trunnion, for example by being threaded on to it. The hollow trunnion 13 is mounted in a clamping sleeve 14 of the table supporting arm (not shown) of the machine tool. The clamping sleeve is, in conventional manner, tensioned around the trunnion 13 by means of a tensioning device 15. The cylinder 12 is operated by means of a valve 18 having an operating lever 18a.

The rod 11 passes, with radial play, through a central opening 16 in the clamping plate 8 and engages axially, likewise with play, with the top side of the clamping plate by means of a head 11a at the upper end of the rod, and with its bottom side by means of an enlarged portion on the rod, suitably a ring 11b fastened on the rod. The head 11a of the rod is journalled in a central opening 17 in the upper portion or work surface 2. The head is provided with a threaded hole 11c.

Figure 3:
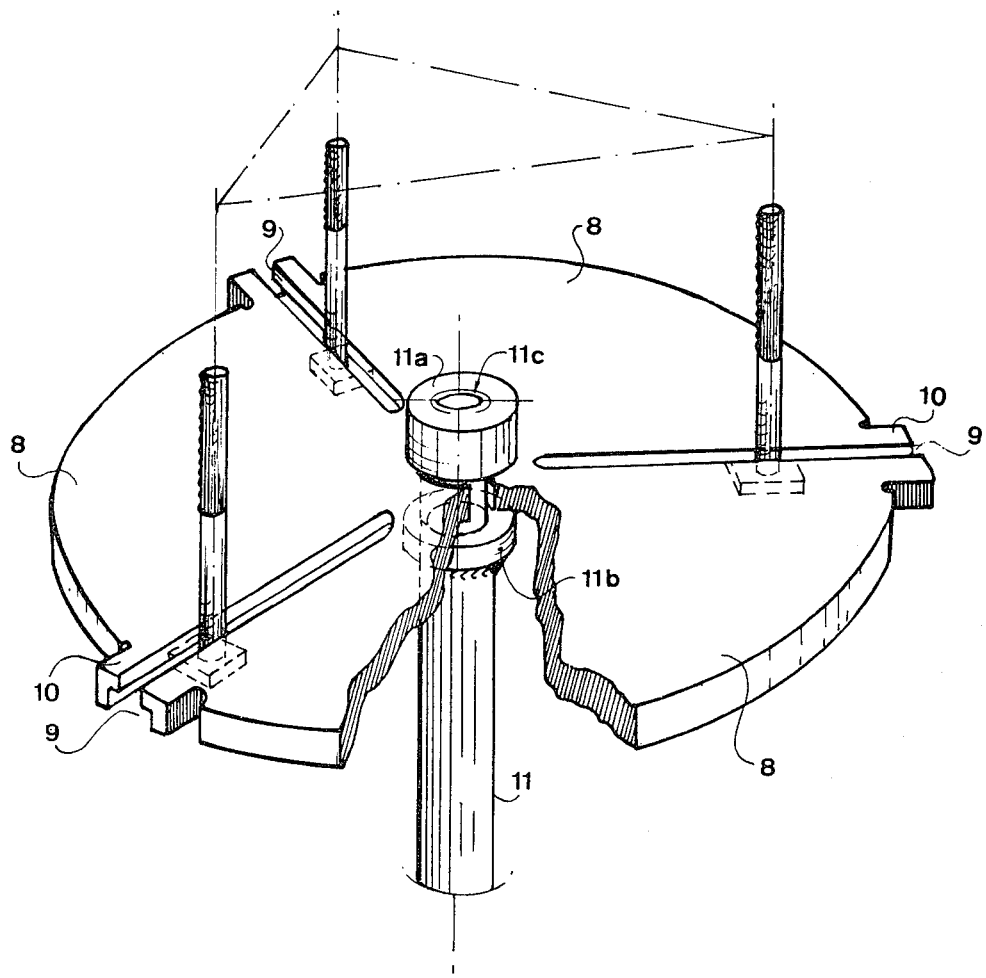
FIG. 3 is a perspective view showing how the table's clamping device for work pieces gives automatic compensation for varying engagement heights of the clamping devices.

The work table functions as follows: To clamp work pieces on the table T-bolts are used, which are inserted into the T-grooves 9 of the clamping plate 8 and which are in the usual way fitted with nuts and clamping irons. After these clamping devices have been fitted in place, the workpiece can instantaneously be clamped or released by operation, by means of the valve 18, of the cylinder 12 and the movable rod 11, which moves the clamping plate 8 downwards or upwards. During the movement of the clamping plate it is guided laterally by the protruding portions 10 which travel in the openings 7 of the flange 3. Apart from being guided laterally in this way, so that the grooves 9 of the clamping plate are always directly below the grooves 6 of the work surface 2, the clamping plate is, owing to its being connected with play to the rod 11, free to assume inclined positions in any direction in relation to the work surface 2, to the extent permitted by the vertical distance between the work surface and the lower portion 4 of the table. In this way, height differences between the points of engagement against the workpiece are automatically compensated for, when the workpiece is to be clamped simultaneously at more than one point. It is therefore not necessary to make a careful adjustment of the height of the clamping devices in relation to the workpiece, but only a quick and approximate adjustment. Automatic height compensation is obtained at up to two points along the same line, or three points forming the corners of a triangle, as illustrated in FIG. 3, provided that the clamping force transmitted by the rod 11 is applied inside the boundary-lines of the triangle. Even if only two points are utilized, the advantage is that these can be in any direction from one T-groove 9 in the clamping plate to another. Devices with movable, T-grooved clamping bars of the types earlier known are limited to the once and for all given longitudinal direction of the clamping bar.

In addition to the clamping advantages described above, other advantages are also obtained with the invention. Since the clamping plate 8 is actuated by a power transmitting device—the rod 11—which is arranged centrally in the table, and since the trunnion 13 carrying the table has been made hollow, this trunnion and the machine tool's ordinary work table fastening device—the clamping sleeve 14—can be used for journalling the rod 11 and for connecting the compressed-air cylinder 12 downwards. These means will therefore not increase the building height of the table, nor take up any room on the top of the table, but the work surface of the table is free. Another great advantage of arranging the driving and power transmitting means centrally in the table in the way described is that the whole table can easily be made rotatable, if the trunnion 13 is journalled rotatably in the clamping sleeve 14. It will then also be possible, in a simple way, to add to the table an indexing pin arranged stationary below the rotatable table and co-operating with holes or stops on the underside of the table, whereby a built-in indexing apparatus is obtained. A combination clamping and indexing table of this type is described further in Applicant's Swedish patent application No. 7806548-9.

We claim:

1. A work table for machine tools, such as pillar-type drills and the like, comprising:
    (a) a substantially horizontal plate forming a work surface (2) having a plurality of grooves (6) cut through said plate and extending from an inner portion of said work surface to the outer edge thereof;
    (b) a flange (3) depending from and surrounding the outer edge of said work surface and supported on a base plate (4);
    (c) said flange having a plurality of substantially vertical openings (7) aligned with the grooves (6) in said horizontal plate;
    (d) a clamping plate mounted to move vertically beneath said work surface within a space defined by said flange (3) and said base plate;
    (e) said clamping plate being provided with a plurality of T-grooves (9) extending in aligned relationship with the grooves (6) in said horizontal plate;
    (f) said clamping plate additionally having projections (10) guided in the openings (7) of said flange (3); and
    (g) power transmitting means providing movement of said clamping plate into positions relatively inclined to said work surface.

2. A work table according to claim 1, in which said power transmitting means comprises a pneumatically actuated vertically movable rod (11) pivotally connected to the center portion of the clamping plate and loosely guided in a hollow trunnion (13) fixed at one end to the base plate (4) and at the other end clamped in position on the machine tool.

3. A work table according to claim 2, in which the vertical rod (11) is passed through a central opening (16) of the clamping plate with substantial play, and axially engages the top side of the clamping plate, also with substantial play, by means of a head (11a) at the upper end of the rod, said rod engaging the bottom side of the clamping plate by means of an enlarged portion (11b) on the rod, said head and enlarged portion having a larger diameter than the central opening (16).

4. A work table according to claim 3, in which the head (11a) on the rod is additionally passed through a central opening (17) in the work surface (2) and provided with an upwardly facing threaded opening (11c).

* * * * *